(12) United States Patent
Panciroli et al.

(10) Patent No.: US 10,920,685 B2
(45) Date of Patent: Feb. 16, 2021

(54) ESTIMATION METHOD TO DETERMINE THE CONCENTRATION OF RECIRCULATED EXHAUST GAS PRESENT IN A CYLINDER OF AN INTERNAL COMBUSTION ENGINE

(71) Applicant: MARELLI EUROPE S.p.A., Corbetta (IT)

(72) Inventors: Marco Panciroli, Bologna (IT); Gaetano Di Vieste, Bologna (IT)

(73) Assignee: MARELLI EUROPE S.p.A., Corbetta (IT)

( * ) Notice: Subject to any disclaimer, the term of this patent is extended or adjusted under 35 U.S.C. 154(b) by 0 days.

(21) Appl. No.: 16/601,727

(22) Filed: Oct. 15, 2019

(65) Prior Publication Data

US 2020/0123991 A1    Apr. 23, 2020

(30) Foreign Application Priority Data

Oct. 17, 2018    (IT) .................. 102018000009537

(51) Int. Cl.
  *F02D 35/02*    (2006.01)
  *F02D 28/00*    (2006.01)
(52) U.S. Cl.
  CPC ............. *F02D 35/02* (2013.01); *F02D 28/00* (2013.01)
(58) Field of Classification Search
  CPC ...... F02D 28/00; F02D 35/02; F02D 41/0072; F02D 41/144; F02D 41/1456;
  (Continued)

(56) References Cited

U.S. PATENT DOCUMENTS

2012/0037134 A1*  2/2012  Jankovic .............. F02M 26/06
                                                         123/568.21
2017/0268451 A1    9/2017  Pursifull et al.

FOREIGN PATENT DOCUMENTS

DE    102005044266 A1    3/2007
EP       0843084 A2    5/1998
(Continued)

OTHER PUBLICATIONS

Search Report for Italian Application No. 201800009537 dated Jun. 13, 2019.

*Primary Examiner* — Brandon D Lee
(74) *Attorney, Agent, or Firm* — Howard & Howard Attorneys PLLC

(57) ABSTRACT

An estimation method to determine the concentration of recirculated exhaust gas present in a cylinder of an internal combustion engine; the concentrations of recirculated exhaust gas in a gas mixture flowing through an intake duct are periodically stored in a buffer; a first instant is determined, in which a programming of a following combustion in the cylinder is carried out; an advance time is determined, which elapses between the first instant and a second instant in the future, in which air will be taken into the cylinder for the following combustion in the cylinder; a transport time is determined; a third instant in the past is determined by subtracting from the first instant an amount of time which is equal to the difference between the transport time and the advance time; and the concentration of recirculated exhaust gas present in the cylinder in the second instant is estimated depending on a concentration of recirculated exhaust gas contained in the buffer (30) and corresponding to the third instant.

14 Claims, 3 Drawing Sheets

(58) Field of Classification Search
CPC ............ F02D 2041/1431; F02M 26/46; F02M 35/10393; F02M 26/06; Y02T 10/40
See application file for complete search history.

(56) References Cited

FOREIGN PATENT DOCUMENTS

| | | |
|---|---|---|
| EP | 3040541 A1 | 7/2016 |
| EP | 3128158 A1 | 2/2017 |
| EP | 3128159 A1 | 2/2017 |

* cited by examiner

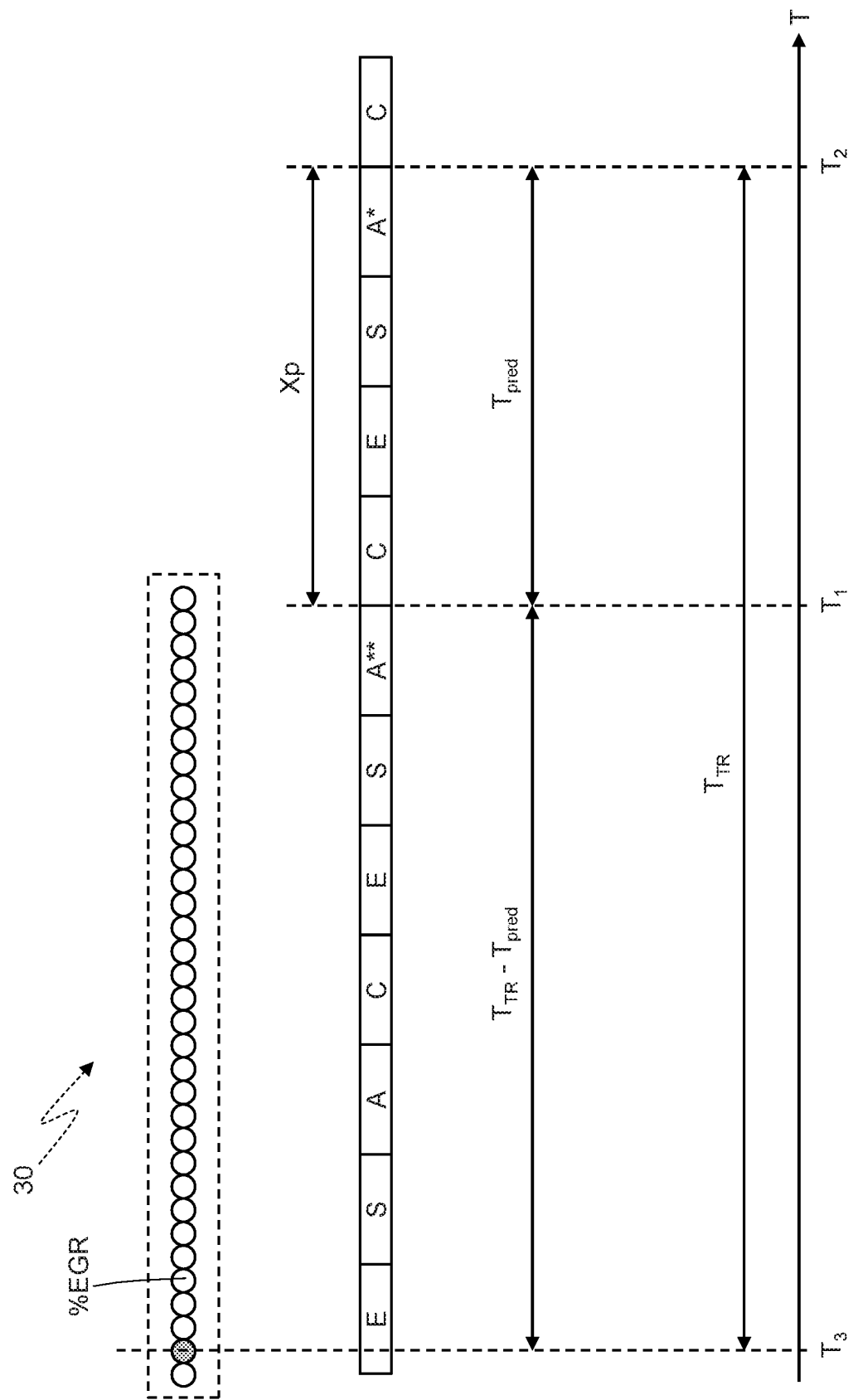

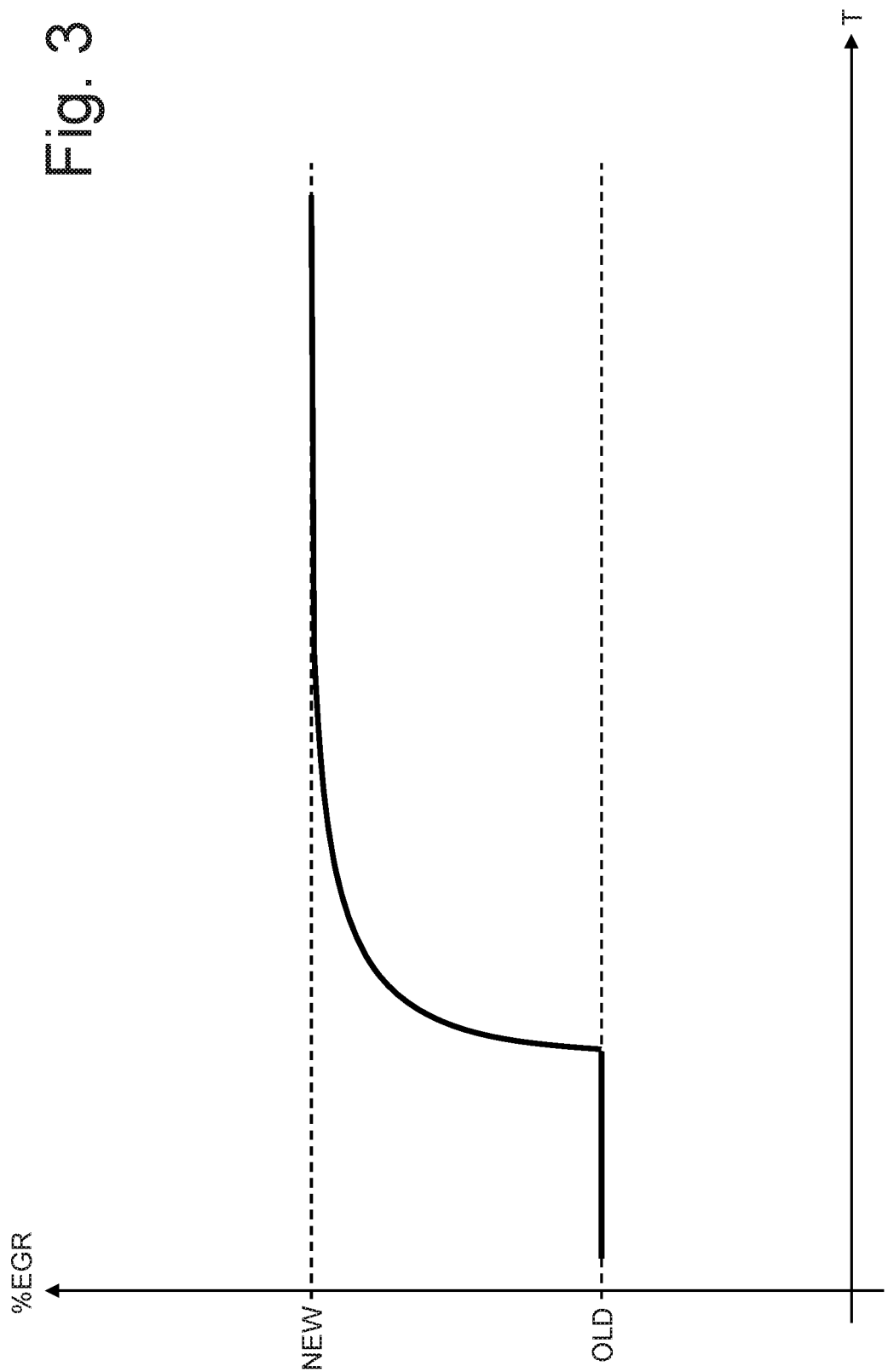

ESTIMATION METHOD TO DETERMINE THE CONCENTRATION OF RECIRCULATED EXHAUST GAS PRESENT IN A CYLINDER OF AN INTERNAL COMBUSTION ENGINE

CROSS-REFERENCE TO RELATED APPLICATIONS

This Patent Application claims priority from Italian Patent Application No. 102018000009537 filed on Oct. 17, 2018, the entire disclosure of which is incorporated herein by reference.

TECHNICAL FIELD

The invention relates to an estimation method to determine the concentration of recirculated exhaust gas present in a cylinder of an internal combustion engine.

PRIOR ART

As it is known, an internal combustion engine comprises a number of cylinders, each connected to an intake manifold by means of at least one respective intake valve and to an exhaust manifold by means of at least one respective exhaust valve. The intake manifold receives, through an intake duct, a gas mixture comprising exhaust gases (coming from the EGR circuits) and fresh air (coming from the outside).

In modern internal combustion engines, the exhaust gases (namely, burnt gases) are recirculated, which means that a small part (5-25%) of the exhaust gases are recirculated by causing them to flow from the exhaust duct to the intake duct in order to reduce a part of the pollutants (mainly Nox) present in the exhaust gases.

An internal combustion heat engine operating according to the Otto cycle (namely, an engine where the mixture is ignited by a spark) should (almost) always carry out the combustion in the cylinders with a ratio equal to the stoichiometric ratio between oxygen (air) and fuel (gasoline or the like); as a consequence, in order to correctly program the combustion in the cylinders (namely, in order to operate the actuators regulating the feeding of air and fuel with a suitable advance), the composition of the gas mixture that will be present inside the cylinder in the moment of the combustion must be know with a certain advance. In other words, the concentration of recirculated exhaust gas present in the gas mixture that will be present in a cylinder in the moment of the combustion must be known; or, from another and complementary point of view, it is necessary to know the concentration of fresh air, hence of oxygen, present in the gas mixture that will be present inside a cylinder in the moment of the combustion (the gas mixture that will be present inside a cylinder in the moment of the combustion consists of fresh air coming from the outside and of exhaust gas recirculated through the EGR system; therefore, if one knows the concentration of fresh air, the concentration of recirculated exhaust gas can be easily determined through subtraction, and vice versa).

If the estimation of the concentration of recirculated exhaust gas present in the gas mixture that will be present inside a cylinder in the moment of the combustion is not sufficiently precise, it is necessary to increase the quantity of fuel relative to the ideal value (stoichiometric value) in order to avoid the risk of occurrence of knock phenomena or even of mega-knock phenomena; however, this enrichment (namely, this increase in the quantity of fuel) cancels the benefits deriving from the recirculation of the exhaust gases, as it determines an increase in the generation of pollutants during the combustion.

Patent applications EP3040541A1, EP3128159A1 and EP3128158A1 disclose an internal combustion engine provided with a sensor, which is arranged along the intake duct and measures the concentration of oxygen in the gas mixture flowing along the intake duct; depending on the reading of the sensor measuring the concentration of the oxygen in the gas mixture flowing along the intake duct, one determines the mass flow rate of the low-pressure exhaust gas recirculation EGR circuit, namely one determines the concentration of recirculated exhaust gas present in the gas mixture flowing into the cylinders. However, this determination of the concentration of recirculated exhaust gas present in the gas mixture flowing into the cylinders is very precise in a stationary running mode (namely, when the speed of rotation and the engine point remain stable over time), but, unfortunately, it becomes (relatively) scarcely precise in a dynamic running mode (namely, when the rotation speed and/or the engine point keep evolving) because it measures the concentration of oxygen in the gas mixture flowing along the intake duct in a time instant that it different from (in advance relative to) the actual moment in which the gas mixture flows into the cylinders.

Patent applications DE102005044266A1, US2012037134A1, US2017268451A1 and EP0843084A2 disclose an internal combustion engine control method, which involves measuring the mass flow rate and the concentration of oxygen in the gas mixture (consisting of fresh air and recirculated exhaust gas) flowing along an intake duct.

DESCRIPTION OF THE INVENTION

The object of the invention is to provide an estimation method to determine the concentration of recirculated exhaust gas present in a cylinder of an internal combustion engine, said estimation method allowing for an extremely precise determination of the concentration of recirculated exhaust gas present in a cylinder of an internal combustion engine in all possible operating conditions.

According to the present invention, there is provided an estimation method to determine the concentration of recirculated exhaust gas present in a cylinder of an internal combustion engine according to the appended claims.

BRIEF DESCRIPTION OF THE DRAWINGS

The invention will now be described with reference to the accompanying drawings, showing a non-limiting embodiment thereof, wherein:

FIG. 2 schematically shows an estimation logic implemented in the electronic control unit; and FIG. 3 shows the effect of a first order filter which is applied to the estimation of the concentration of oxygen (equivalent to the estimation of the concentration of exhaust gas).

PREFERRED EMBODIMENTS OF THE INVENTION

Figure 1:
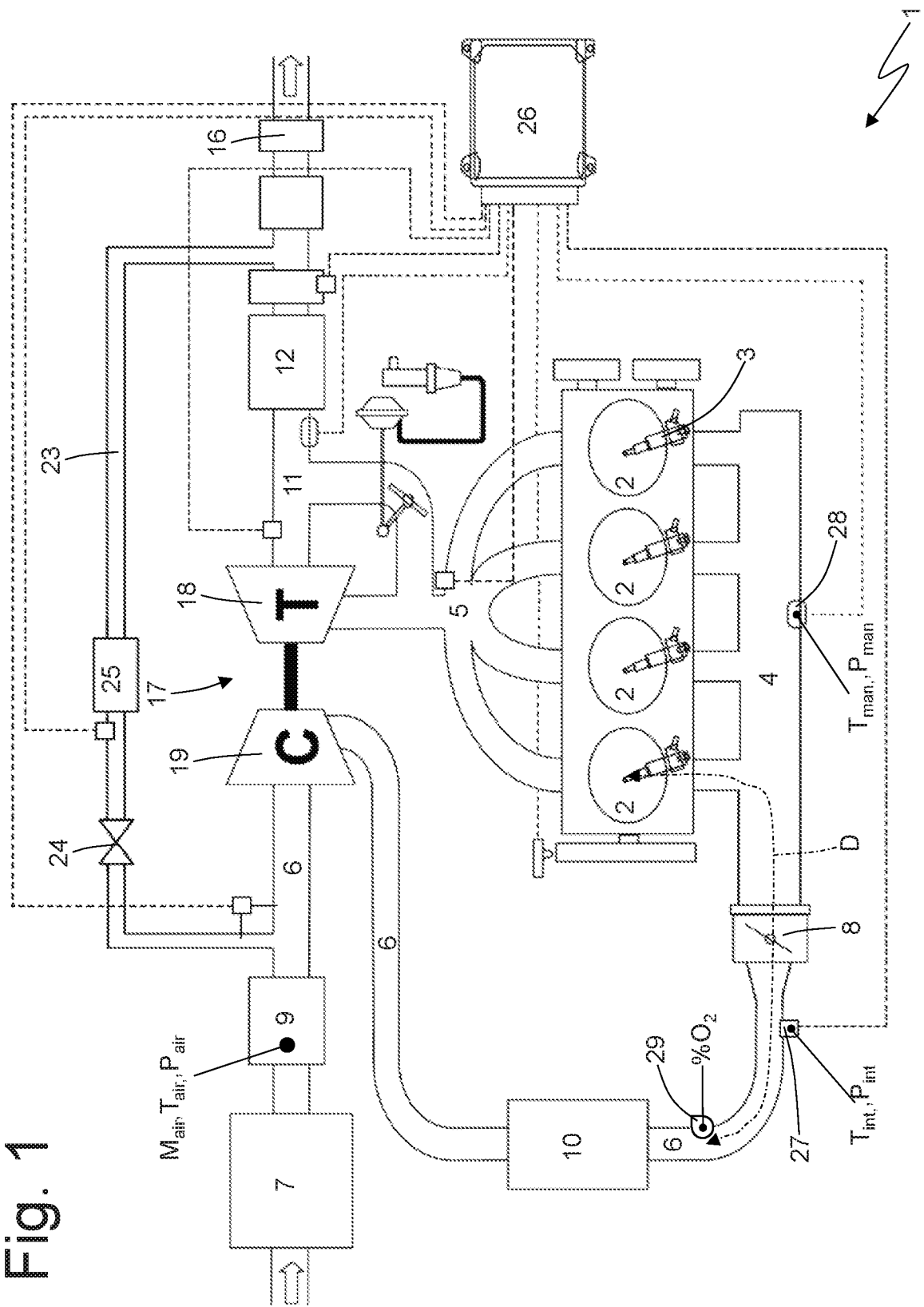
FIG. 1 schematically shows an internal combustion engine provided with an electronic control unit implementing the estimation method according to the invention.

In FIG. 1, number 1 indicates, as a whole, an internal combustion engine supercharged by means of a turbocharger supercharging system.

The internal combustion engine 1 comprises four cylinders 2 and four injectors 3, which directly inject fuel into the cylinders 2. Each cylinder 2 is connected to an intake manifold 4 by means of at least one respective intake valve (not shown) and to an exhaust manifold 5 by means of at least one respective exhaust valve (not shown).

The intake manifold 4 receives a gas mixture comprising exhaust gases (as described more in detail below) and fresh air (i.e. air coming from the outside) through an intake duct 6, which is provided with an air filter 7 for the fresh air flow and is regulated by a throttle valve 8, which is arranged between the intake duct 6 and the intake manifold 4. Along the intake duct 6 and downstream of the air filter 7 there is also a multiple sensor 9, which measures the inflowing air flow rate $M_{AIR}$, the inflowing air temperature $T_{AIR}$ and the intake pressure $P_{air}$ downstream of the air filter 7.

Along the intake duct 6 there is provided an intercooler 10, which fulfils the function of cooling the air taken in (alternatively, the intercooler 10 could be built-in in the intake manifold 4 in order to reduce the overall length of the intake duct 6).

The exhaust manifold 5 is connected to an exhaust duct 11, which is part of an exhaust system and releases the gases produced by the combustion into the atmosphere. An oxidation catalytic converter 12 and a silencer 16 are arranged in succession along the exhaust duct 11.

The supercharging system of the internal combustion engine 1 comprises a turbocharger 17 provided with a turbine 18, which is arranged along the exhaust duct 11 so as to rotate at a high speed due to the action of the exhaust gases expelled from the cylinders 2, and a compressor 19, which is arranged along the intake duct 6 and is mechanically connected to the turbine 18 so as to be caused to rotate by the turbine 18 in order to increase the pressure of the air present in the feeding duct 6. In the embodiment shown in FIG. 1, the turbine 18 is provided with a wastegate valve, which allows the exhaust gases to bypass the turbine 18; the operation of the wastegate valve, which is aimed at preventing the supercharging system from being excessively stressed, keeps the speed of rotation of the turbine 18 within certain limits, thus also limiting the supercharging pressure on the intake side. According to a possible embodiment, the impeller of the turbine 18 has a variable geometry and the geometry of the impeller of the turbine 18 is controlled by a (generally electric) actuator so as to enhance the speed or, alternatively, the flow rate of the exhaust gases.

The internal combustion engine 1 comprises a low-pressure exhaust gas recirculation circuit, which comprises, in turn, an EGR duct 23 originating from the exhaust duct 10, preferably downstream of the oxidation catalytic converter 12, and leading into the intake duct 6, downstream of the multiple sensor 9. Along the EGR duct 23 there is provided a low-pressure EGR valve 24, which is designed to adjust the flow rate of the exhaust gases flowing through the EGR duct 23. Along the EGR duct 23, upstream of the low-pressure EGR valve 24, there is also provided a heat exchanger 25, which fulfils the function of cooling the gases flowing out of the exhaust duct 10 and into the compressor 19.

The internal combustion engine 1 is controlled by an electronic control unit 26, which controls the operation of all the components of the internal combustion engine 1.

The control unit 26 is connected to a sensor 27, which is arranged along the intake duct 6 immediately upstream of the throttle valve 8 and measures the temperature $T_{int}$ and the pressure $P_{int}$ of the gas mixture flowing through the intake duct 6. The control unit 26 is connected to sensor (totally similar to the sensor 27), which is arranged inside the intake manifold 4 and measures the temperature $T_{man}$ and the pressure $P_{man}$ of the gas mixture present inside the intake manifold 4. Finally, the control unit 26 is connected to a sensor 29, which is arranged along the intake duct 6 (upstream of the sensor 27) and measures the percentage $\% O_2$ of oxygen (namely, the concentration $\% O_2$ of oxygen) in the gas mixture flowing through the intake duct 6; in particular, the sensor 29 is a UEGO (Universal Exhaust Gas Oxygen) lambda sensor whose output is a value that can vary in current depending on the lambda value and can be used to determine the percentage $\% O_2$ of oxygen. According to a preferred embodiment, the reading provided by the sensor 29 is improved (namely, made more precise and reliable) according to the disclosure of patent applications EP3040541A1, EP3128159A1 and EP3128158A1.

Hereinafter you will find a description of the strategy implemented in the electronic control unit 26 to determine the concentration of recirculated exhaust gas present in a cylinder 2 in the moment of the combustion (namely, to determine the concentration of fresh air, hence of oxygen, present in a cylinder 2 in the moment of the combustion). It should be pointed out that, in the fresh air (namely, air coming from the outside), the concentration (namely, the percentage) of oxygen is substantially constant (dry air at the ground level approximately consists of 78.09% of nitrogen —$N_2$—, 20.9% of oxygen —$O_2$—, 0.93% of argon —Ar— and 0.04% of carbon dioxide —$CO_2$—, with the addition of other components in smaller quantities); as a consequence, the concentration (namely, the percentage) of oxygen easily leads (through a simple multiplication) to the determination of the concentration of fresh air and vice versa.

The total mass flow rate $M_{TOT}$ of the gas mixture flowing through the intake duct 6 satisfies the following equation:

$$M_{TOT}=M_{EGR\_LP}+M_{AIR} \qquad [1]$$

$$M_{EGR\_LP}=M_{TOT}-M_{AIR} \qquad [1]$$

$M_{TOT}$ mass flow rate of the gas mixture flowing through the intake duct 6;

$M_{AIR}$ mass flow rate of the fresh air coming from the outside which flows through the intake duct 6; and $M_{EGR\_LP}$ mass flow rate of the exhaust gases recirculated through the low-pressure circuit $EGR_{LP}$ (namely, through the EGR circuit 23) which flows through the intake duct 6.

We define as follows the quantity $R_{EGR}$, which indicates the incidence of the low-pressure EGR circuit on the total mass flow rate $M_{TOT}$ of the gas mixture flowing through the intake pipe 6:

$$R_{EGR}=M_{EGR\_LP}/M_{TOT} \qquad [2]$$

$R_{EGR}$ incidence of the low-pressure EGR circuit on the total mass flow rate $M_{TOT}$ of the gas mixture flowing through the intake pipe 6;

$M_{TOT}$ mass flow rate of the gas mixture flowing through the intake duct 6; and $M_{EGR\_LP}$ mass flow rate of the exhaust gases recirculated through the low-pressure circuit EGRLP which flows through the intake duct 6.

Inserting equation [1] in equation [2], you obtain that:

$$R_{EGR}=(M_{TOT}-M_{AIR})/M_{TOT}=1-(M_{AIR}/M_{TOT}) \qquad [3]$$

$R_{EGR}$ incidence of the low-pressure EGR circuit on the total mass flow rate $M_{TOT}$ of the gas mixture flowing through the intake pipe 6;

$M_{TOT}$ mass flow rate of the gas mixture flowing through the intake duct 6; and $M_{AIR}$ mass flow rate of the fresh air coming from the outside which flows through the intake duct 6.

If we take into account the fact that the mass flow rate of the fresh air coming from the outside which flows through the intake duct 6 contains approximately 21% of oxygen, the following equation applies:

$$M_{AIR} * 21 = M_{TOT} * \% O_2 \quad [5]$$

$$M_{AIR}/M_{TOT} = \% O_2/21 \quad [5]$$

$M_{TOT}$ mass flow rate of the gas mixture flowing through the intake duct 6;

$M_{AIR}$ mass flow rate of the fresh air coming from the outside which flows through the intake % $O_2$ percentage of oxygen contained in the mass flow rate of the gas mixture flowing through the intake duct 6, which is detected by means of the sensor 29.

Inserting equation [4] in equation [5], you can obtain that:

$$R_{EGR} = 1 - (\% O_2/21) \quad [6]$$

$R_{EGR}$ incidence of the low-pressure EGR circuit on the total mass flow rate $M_{TOT}$ of the gas mixture flowing through the intake pipe 6;

% $O_2$ percentage of oxygen contained in the mass flow rate of the gas mixture flowing through the intake duct 6, which is detected by means of the sensor 29.

According to a possible variant, the multiple sensor 9 is configured to also detect, besides the mass flow rate $M_{AIR}$ and the temperature $T_{AIR}$ of the fresh air coming from the outside and flowing through the intake duct 6, the psychometric level $PSI_{AIR}$ of the fresh air coming from the outside and flowing through the intake duct 6.

Therefore, one can improve the estimate of the quantity (or ratio) $R_{EGR}$ indicating the incidence of the low-pressure circuit EGR on the total mass flow rate $M_{TOT}$ of the gas mixture flowing through the intake duct 6 and make the formula [6] more precise as well as introduce the percentage mass flow rate % $R_{EGR}$ of the low-pressure exhaust gas recirculation circuit EGR in the gas mixture flowing through the intake duct 6 by means of the following formulas:

$$R_{EGR} = 1 - (\% O_2/O_{2\_REF}) \quad [7]$$

$$O_{2\_REF} = f(PSI_{AIR}, T_{AIR}) \quad [8]$$

$R_{EGR}$ incidence of the low-pressure EGR circuit on the total mass flow rate $M_{TOT}$ of the gas mixture flowing through the intake pipe 6;

% $O_2$ percentage of oxygen contained in the mass of the gas mixture flowing through the intake duct 6, which is detected by means of the sensor 29;

$O_{2\_REF}$ reference percentage of oxygen obtained from an experimental map depending on the temperature $T_{AIR}$ and on the psychometric level $PSI_{AIR}$ of the fresh air coming from the outside and flowing through the intake duct 6.

The sensor 29 measuring the percentage % $O_2$ of oxygen contained in the mass of the gas mixture flowing through the intake duct 6 is physically mounted along the intake duct 6 and is approximately halfway between the position of the compressor 19 and the position of the throttle valve 8, namely clearly before the intake valves regulating the inlet of the gas mixture into the cylinders 2. In particular, the sensor 29 is at a distance D (around some dozens of centimetres) from the intake valves regulating the inlet of the gas mixture into the cylinders 2. As a consequence, the percentage % $O_2$ of oxygen measured by the sensor 29 is clearly in advance relative to the loading into the cylinders 2 (namely, relative to the actual moment in which the gas mixture flows into the cylinders 2); in other words, the sensor 29 measures the percentage % $O_2$ of oxygen in a gas mixture that will actually flow into the cylinders 2 later, namely with a delay relative to the instant in which the percentage % $O_2$ of oxygen is measured (hence, the measurement of the percentage % $O_2$ of oxygen is in advance relative to the instant in which the gas mixture actually flows into the cylinders 2). In a stationary running mode (namely, when the rotation speed and the engine point remain stable over time), the advance of the measurement of the percentage % $O_2$ of oxygen carried out by the sensor 29 has no impact as the percentage % $O_2$ of oxygen is constant over time as well (or, anyway, it changes very slowly with times of variation that are significantly longer than the advance of the measurement); on the other hand, in a dynamic running mode (namely, when the rotation speed and/or the engine point keep evolving), the percentage % $O_2$ of oxygen changes over time as well (i.e. it changes rapidly with times of variation that are shorter than the advance of the measurement) and, hence, the advance of the measurement of the percentage % $O_2$ of oxygen carried out by the sensor 29 leads to an error in the programming of the combustion in the cylinders 2, if it is not properly corrected in the ways described below.

According to FIG. 2, in each cylinder 2 there cyclically are, one after the other, four phases (strokes of the piston), which make up one single combustion cycle: intake (A), compression (C), power (E), exhaust (S); at the beginning of each stroke (namely, at the end of the previous stroke), the corresponding piston reaches a dead centre (ether a top dead centre or a bottom dead centre) in which the direction of the motion is reversed and, hence, each stroke involves a displacement of the piston from a dead centre to the other dead centre.

The control unit 26 must program the combustion in each cylinder 2 with an advance that is equal to a predetermined number of strokes Xp; obviously, an advance time $T_{pred}$ corresponding to the number Xp of strokes is variable since it depends on the speed of rotation of the internal combustion engine 1 according to the following equation:

$$T_{pred} = Xp/(2*\omega) \quad [9]$$

$T_{pred}$ advance time;

Xp number of advance strokes;

ω rotation speed of the internal combustion engine 1 (e.g. measured in revolutions per second).

In other words, the advance time $T_{pred}$ corresponds to an amount of time elapsing between a programming of the combustion in a cylinder 2 and the execution (namely, the actual carrying out) of the combustion in the cylinder 2.

The control unit 26 periodically receives (for example, with a period of 4 ms, namely every 4 ms) the measurements of the percentage % $O_2$ of oxygen carried out by the sensor 29, determines a concentration (namely, a percentage) % EGR of recirculated exhaust gas present in the air flowing through the intake duct 6 in the area of the sensor 29 depending on each percentage % $O_2$ of oxygen measured by the sensor 29, and stores these concentrations % EGR of recirculated exhaust gas in a buffer 30 (which is schematically shown in FIG. 2, which shows that in the buffer 30 there is a succession of concentrations % EGR of recirculated exhaust gas). According to a different embodiment, the measurements of the percentage % $O_2$ of oxygen are stored in the buffer 30 (namely, in the buffer 30 there is a succession of measurements of the percentage % $O_2$ of oxygen) and the concentration % EGR of recirculated exhaust gas is determined in later depending on a corresponding measurement of the percentage % $O_2$ of oxygen. Obviously, the buffer 30 has a finite size and, therefore, contains a fixed and predetermined number of concentrations % EGR of recirculated exhaust gas (determined based on the measurements of the percentage % $O_2$ of oxygen carried out by the sensor 29); every time a new concentration % EGR of recirculated exhaust gas is calculated (namely, every time the sensor 29 provides a new measurement), the new concentration % EGR of recirculated exhaust gas becomes the most recent, namely the youngest concentration % EGR of recirculated exhaust gas and the least recent, namely the oldest concentration % EGR of recirculated exhaust gas is eliminated from the buffer 30. By way of example, the sensor 29 provides a new measurement of the percentage % $O_2$ of oxygen every 4 ms (hence, a new value of the concentration % EGR of recirculated exhaust gas is stored in the buffer 30 ever 4 ms and an old value of the concentration % EGR of recirculated exhaust gas is cancelled).

Furthermore, the control unit 26 calculates a transport time $T_{TR}$ needed by the gas mixture to flow from the point where the sensor 29 measuring the percentage % $O_2$ of oxygen is located to a cylinder 2 by means of the following equation:

$$T_{TR} = D/S_{TR} \quad [10]$$

$T_{TR}$ transport time;
D distance existing between the position of the sensor 29 measuring the percentage % $O_2$ of oxygen and a cylinder 2;
$S_{TR}$ transport speed.

In other words, the control unit 26 knows the distance D existing between the position of the sensor 29 measuring the percentage % $O_2$ of oxygen and a cylinder 2 (said distance D is due to the geometry of the internal combustion engine 1 and is a fixed design information known a priori), estimates (in the ways described below) the transport speed $S_{TR}$ with which the gas mixture flows along the intake duct 6 and, hence, through the intake manifold 4 (namely, with which the gas mixture covers the distance D), and, then, calculates the transport time $T_{TR}$ with a simple division.

It should be pointed out that for each cylinder 2 there is a corresponding distance D which can be (slightly) different from the distance D of the other cylinders 2 (namely, smaller if the cylinder 2 is closer to the throttle valve 8 and greater if the cylinder 2 is farther from the throttle valve 8); hence, for each cylinder 2, a corresponding transport $T_{TR}$ time is calculated which is potentially (slightly) different from the transport times $T_{TR}$ of the other cylinders 2, provided that other factors are the same.

In order to determine the percentage % $O_2$ of oxygen that will be present in a cylinder 2 at the end of an intake stroke A, the control unit 26 synchronizes the concentrations % EGR of recirculated exhaust gas (calculated based on the measurements of the percentage % $O_2$ of oxygen carried out by the sensor 29 and stored in the buffer 30 in a time sequence) with the prediction of the intake (which is part of programming of the combustion). The programming of the combustion involves establishing how to control the actuators regulating the feeding of the actors of the combustion into the cylinder 2, namely the feeding of the air containing the oxygen (the oxidant), the feeding of the fuel (the reductant) and the ignition of the spark (which starts the combustion, obviously only in case of a spark ignition engine); as a consequence, the programming of the combustion involves establishing how to control the injectors feeding the fuel, establishing how to control the ignition coil (if present, namely only in case of a spark ignition engine), establishing how to control the throttle valve 8, and establishing how to control the intake valves (obviously, when the intake valve opening and/or closing instant can be adjusted). In other words, programming the combustion can mean: programming the control of the actuators regulating the feeding of air to the cylinders 2, programming the control of the actuators regulating the feeding of fuel to the cylinders 2 and/or programming the (spark) ignition of the mixture in the cylinders 2.

In order to carry out this synchronization and as schematically shown in FIG. 2, the current instant is the instant $T_1$ (namely, the engine control is in instant $T_1$) and it is necessary to program the combustion taking place immediately after the instant $T_2$ in which the intake stroke A* corresponding to the combustion to be programmed takes place (according to FIG. 2, the end of the intake stroke is usually taken into account); between the instant $T_1$ and the instant $T_2$ (which is timewise subsequent to the instant $T_1$ and, hence, is in the future relative to the instant $T_1$) there is the advance time $T_{pred}$ (corresponding to the number of advance strokes Xp). Starting from the current instant $T_1$ and adding the advance time $T_{pred}$ to the instant $T_1$, you obtain the (future) instant $T_2$ in which the intake stroke A* corresponding to the combustion to be programmed takes place. By subtracting from the instant $T_2$ (namely by advancing the instant $T_2$) the transport time $T_{TR}$, an instant $T_3$ (in the past) is determined, in which the concentration % EGR of recirculated exhaust gas (calculated based on the percentage % $O_2$ of oxygen measured by the sensor 29) is read in the buffer 30 and this measurement is used to program the combustion corresponding to the intake stroke A*. In other words, in order to synchronize the concentration % EGR f recirculated exhaust gas with the programming of the combustion corresponding to the intake stroke A*, the buffer 30 is read so as to get the concentration % EGR of recirculated exhaust gas corresponding to the instant $T_3$, which can be obtained by subtracting (decreasing) from the current instant $T_1$ in which the programming of the combustion is carried out an amount of time equal to the difference between the transport time $T_{TR}$ and the advance time $T_{pred}$. The transport time $T_{TR}$ usually is greater than (or, at most, equal to) the advance time $T_{pred}$.

According to a preferred, though non-binding embodiment, when programming the combustion corresponding to the intake stroke A*, the concentration % EGR of recirculated exhaust gas in the instant $T_3$ is not directly used, but a first order filter is applied to said concentration % EGR of recirculated exhaust gas in the instant $T_3$, said first order filter taking into account the mixing of the gases in the intake manifold 4 (namely, it creates a model of the mixing of the gases inside the intake manifold 4 and, hence, simulates the effect of the mixing of the gases inside the intake manifold 4). In other words, the change in the concentration % EGR of recirculated exhaust gas from the value prior to the new value does not take place instantaneously (namely, with a stepped law of variation which does not correspond to the physical reality), but it takes place in a gradual manner with an exponential law of variation (corresponding to a first order filter). What described above is represented in FIG. 3, which shows how the transition from the previous value ("OLD") of the concentration % EGR of recirculated exhaust gas to the following value ("NEW") of the concentration % EGR of recirculated exhaust gas takes place in a gradual manner according an exponential law (mathematically obtained by means of a first order filter).

According to a possible embodiment, the first order filter used to filter the concentration % EGR of recirculated exhaust gas in the instant 13 (namely, used to slow down the transition from the previous value to the following value of the concentration % EGR of recirculated exhaust gas) has a constant gain. Alternatively, the gain of the first order filter is variable and is determined depending on an experimental map, which is stored in the control unit 26 and provides the gain of the first order filter based on the mass flow rate $M_{TOT}$ of the gas mixture flowing through the intake duct 6; according to a further variant, the gain of the first order filter is variable and is determined depending on an experimental map, which is stored in the control unit 26 and provides the gain of the first order filter based on the mass flow rate $M_{TOT}$ of the gas mixture flowing through the intake duct 6 and also based on the advance time $T_{pred}$. Said map is determined in an experimental manner during a laboratory adjustment phase; namely, an internal combustion heat engine 1 is used, in which a series of high-performance laboratory sensors (i.e. sensors that are both very precise and very quick) are installed in order to determine the ideal value of the gain of the first order filter in all possible operating points.

According to a preferred, though non-limiting embodiment, the transport speed $S_{TR}$ (namely, the mean speed with which the gases flow along the intake duct 6 and the intake manifold 4) is calculated by the control unit 26 by means of the following equation:

$$S_{TR} = M_{TOT}/(\rho * S) \qquad [11]$$

$S_{TR}$ transport speed;
$M_{TOT}$ mass flow rate of the gas mixture flowing through the intake duct 6;
$\rho$ density of the gas mixture flowing through the intake duct 6;
S cross section of the intake duct 6.

The mass flow rate $M_{TOT}$ of the gas mixture flowing through the intake duct 6 is estimated by the control unit in a known manner using standard engine control strategies (for example, it could be estimated by the model known as "speed density"); in other words, the control unit 26 carries out standard engine control strategies which, among other things, can allow for the determination of a reliable estimation of the mass flow rate $M_{TOT}$ of the gas mixture flowing through the intake duct 6. Alternatively, the mass flow rate $M_{TOT}$ of the gas mixture flowing through the intake duct 6 could be calculated using equation [1] identified above (or another similar equation) and knowing the mass flow rate $M_{AIR}$ of the fresh air coming from the outside (for example from the measurement of an air flow meter) and from the value of the EGR concentration obtained from the measurement of the percentage of oxygen or, alternatively, from the mass flow rate $M_{EGR\_LP}$ of the exhaust gases recirculated through the low-pressure circuit $EGR_{LP}$.

The density $\rho$ of the gas mixture flowing through the intake duct 6 can be determined depending on an experimental map, which is stored in the control unit 26 and provides the density $\rho$ of the gas mixture based on the temperature T and the pressure P of the gas mixture; the temperature T and the pressure P of the gas mixture can be the temperature $T_{int}$ and the pressure $P_{int}$ of the gas mixture flowing through the intake duct 6, which are measured by the sensor 27, the temperature $T_{man}$ and the pressure $P_{man}$ of the gas mixture present inside the intake manifold 4, which are measured by the sensor 28, or a mean between the measures of the sensors 27 and 28. Said map is determined in an experimental manner during a laboratory adjustment phase; namely, an internal combustion heat engine 1 is used, in which a series of high-performance laboratory sensors (i.e. sensors that are both very precise and very quick) are installed in order to measure the value of the density $\rho$ of the gas mixture in all possible operating points.

Alternatively, the density $\rho$ of the gas mixture flowing through the intake duct 6 can be calculated using the following equation:

$$\rho = P/(R*T) \qquad [12]$$

$\rho$ density of the gas mixture flowing through the intake duct 6;
P pressure of the gas mixture (measured by the sensor 27, measured by the sensor 28 or a mean between the measures of the sensors 27 and 28);
R specific constant of the gas which approximates to the one of the air (which, in a first approximation, can be assumed to be equal to the universal gas constant);
T temperature of the gas mixture (measured by the sensor 27, measured by the sensor 28 or a mean between the measures of the sensors 27 and 28).

Combining equations [10], [11] and [12], you obtain the following equation (which can be implemented in the control unit 26 instead of equations [10], [11] and [12]):

$$T_{TR} = (D*S*P)/(M*R*T) \qquad [13]$$

$T_{TR}$ transport time;
D distance existing between the position of the sensor 29 measuring the percentage % $O_2$ of oxygen and a cylinder 2;
M mass flow rate of the gas mixture flowing through the intake duct 6;
S cross section of the intake duct 6;
P pressure of the gas mixture (measured by the sensor 27, measured by the sensor 28 or a mean between the measures of the sensors 27 and 28);
R specific constant of the gas which approximates to the one of the air (which, in a first approximation, can be assumed to be equal to the universal gas constant);
T temperature of the gas mixture (measured by the sensor 27, measured by the sensor 28 or a mean between the measures of the sensors 27 and 28).

Alternatively, instead of equation [13] the following equation could be used:

$$T_{TR} = (V_{TR}*P)/(M*R*T) \qquad [14]$$

$V_{TR}$ transport volume (namely, the intake volume comprised between the sensor 29 and the intake valves of the cylinder 2 being examined);
M mass flow rate of the gas mixture flowing through the intake duct 6;
P pressure of the gas mixture (measured by the sensor 27, measured by the sensor 28 or a mean between the measures of the sensors 27 and 28);
R specific constant of the gas which approximates to the one of the air (which, in a first approximation, can be assumed to be equal to the universal gas constant);
T temperature of the gas mixture (measured by the sensor 27, measured by the sensor 28 or a mean between the measures of the sensors 27 and 28).

According to a possible embodiment, the transport volume $V_{TR}$ is due to the geometry of the internal combustion engine 1 and is a fixed design information known a priori. According to an alternative embodiment (which is more precise and accurate), the transport volume $V_{TR}$ is determined depending on an experimental map, which is stored in the control unit 26 and provides the transport volume $V_{TR}$ based on the intake efficiency $ET_{int}$ (obtained from the standard engine control strategies used by the control unit 26) and on the rotation speed co of the internal combustion engine 1.

Said map is determined in an experimental manner during a laboratory adjustment phase; namely, an internal combustion heat engine 1 is used, in which a series of high-performance laboratory sensors (i.e. sensors that are both very precise and very quick) are installed in order to measure the value of the transfer volume $V_{TR}$ in all possible operating points.

As already mentioned above, in the buffer 30 there are stored the concentrations % EGR of recirculated exhaust gas calculated depending on the corresponding percentages % 02 of oxygen measured by the sensor 29; alternatively, in the buffer 30 there can be stored the percentages % $O_2$ of oxygen measured by the sensor 29, which will be used later to determine the corresponding concentrations % EGR of recirculated exhaust gas.

In the embodiment shown in the accompanying figures, the internal combustion engine is a turbocharged engine (a volumetric compressor could be used as an alternative to the turbocharger); according to a different embodiment which is not shown herein, the internal combustion engine 1 is an aspirated engine (namely, without supercharging obtained through a turbocharger or a volumetric compressor.

In the embodiment shown in the accompanying figures, the EGR duct 23 leads into the intake duct 6 and, hence, upstream of the throttle valve 8 (obviously, the sensor 29 is arranged along the intake duct 6 downstream of the point of arrival of the EGR duct 23); according to a different embodiment which is not shown herein, the EGR duct 23 leads into the intake manifold 4 and, hence, downstream of the throttle valve 8 (obviously, the sensor 29 is arranged in the intake manifold 4 downstream of the point of arrival of the EGR duct 23).

The embodiments described herein can be combined with one another, without for this reason going beyond the scope of protection of the invention.

The method to estimate the concentration of recirculated exhaust gas present in a cylinder 2 in the moment of the combustion, as disclosed above, has numerous advantages (as already mentioned above, determining the concentration of recirculated exhaust gas means determining the concentration of fresh air/oxygen and vice versa).

First of all, the method to estimate the concentration of recirculated exhaust gas present in a cylinder 2 in the moment of the combustion, as disclosed above, is very precise (namely, makes a modest error) in all possible operating points, not only in a stationary running mode (namely, when the rotation speed and the engine point remain stable over time) but also, especially, in a dynamic running mode (namely, when the rotation speed and/or the engine point keep evolving).

Furthermore, the method to estimate the concentration of recirculated exhaust gas present in a cylinder 2 in the moment of the combustion, as disclosed above, is simple and economic to be implemented as it does not require a significant calculation ability and does not need a large memory space.

LIST OF THE REFERENCE NUMBERS OF THE FIGURES 1 engine
2 cylinders
3 injectors
4 intake manifold
5 exhaust manifold
6 intake duct
7 air filter
8 throttle valve
9 multiple sensor
10 intercooler
11 exhaust duct
12 oxidation catalytic converter
16 silencer
17 turbocharger
18 turbine
19 compressor
23 EGR duct
24 EGR valve
25 heat exchanger
26 electronic control unit
27 sensor
28 sensor
29 sensor
30 buffer
% $O_2$ percentage of oxygen
% EGR concentration of recirculated exhaust gas
D distance
$T_{pred}$ advance time
$T_{TR}$ transport time
Xp number of advance strokes

The invention claimed is:

1. An estimation method to determine the concentration of recirculated exhaust gas present in a cylinder (2) of an internal combustion engine (1), wherein the cylinder (2) receives a gas mixture consisting of fresh air and recirculated exhaust gas through an intake duct (6), which ends in an intake manifold (4); the estimation method comprises the steps of:

periodically measuring a percentage (% $O_2$) of oxygen in a gas mixture flowing through the intake duct (6) or the intake manifold (4) by means of a first sensor (29), which is arranged along the intake duct (6) or in the intake manifold (4);

periodically determining a concentration (% EGR) of recirculated exhaust gas present in the intake duct (6) or in the intake manifold (4) based on a corresponding percentage (% $O_2$) of oxygen measured by the first sensor (29); carrying out in a first instant ($T_1$) a programming of a following combustion in the cylinder (2) subsequent to the first instant ($T_1$);

storing the concentrations (% EGR) of recirculated exhaust gas in a buffer (30) within an electronic control unit (26);

determining an advance time ($T_{pred}$) corresponding to an amount of time between the first instant ($T_1$) and a second instant (12) in the future which is subsequent to the first instant ($T_1$) and in which air will be taken into the cylinder (2) for the following combustion in the cylinder (2);

determining a transport time ($T_{TR}$), greater than or equal to the advance time ($T_{pred}$), needed by the gas mixture to flow from where the first sensor (29) is located to the cylinder (2);

calculating a third instant ($T_3$) in the past, which is prior to the first instant ($T_1$) and thus to the second instant ($T_2$), by subtracting from the first instant ($T_1$) an amount of time equal to the difference between the transport time ($T_{TR}$) and the advance time ($T_{pred}$);

estimating the concentration of recirculated exhaust gas present in the cylinder (2) in the second instant ($T_2$) based on a concentration (% EGR) of recirculated exhaust gas contained in the buffer (30) and corresponding to the third instant ($T_3$);

using, at the first instant ($T_1$), the concentration of recirculated exhaust gas present in the cylinder (2) in the second instant ($T_2$) for programming the following combustion in the cylinder (2); and wherein the programming of the combustion in the cylinder (2) in advance that is equal to a predetermined number (Xp) of advance strokes and the advance time (Tpred) is calculated using the following equation:

$$Tpred = Xp/(2*\omega)$$

Tpred advance time;
Xp predetermine of advance strokes;
ω speed of rotation of the internal combustion engine (1).

2. The estimation method according to claim 1, wherein the transport time ($T_{TR}$) is calculated by means of the following equation:

$$T_{TR} = D/S_{TR} \qquad [10]$$

$T_{TR}$ transport time;
D distance existing between the position of the first sensor (29) and the cylinder (2);
$S_{TR}$ transport speed with which the gas mixture flows along the intake duct (6) and, hence, through the intake manifold (4).

3. The estimation method according to claim 2, wherein the transport speed ($S_{TR}$) is calculated by means of the following equation:

$$S_{TR} = M_{TOT}/(\rho*S) \qquad [11]$$

$S_{TR}$ transport speed;
$M_{TOT}$ mass flow rate of the gas mixture flowing through the intake duct (6);
ρ density of the gas mixture flowing through the intake duct (6);
S cross section of the intake duct (6).

4. The estimation method according to claim 3, wherein the density (ρ) of the gas mixture flowing through the intake duct (6) is determined based on an experimental map, which is stored in the control unit (26) and indicates the density (ρ) of the gas mixture according to a temperature (T) and a pressure (P) of the gas mixture.

5. The estimation method according to claim 3, wherein the density (ρ) of the gas mixture flowing through the intake duct (6) is calculated using the following equation:

$$\rho = P/(R*T) \qquad [12]$$

ρ density of the gas mixture flowing through the intake duct (6);
P pressure of the gas mixture;
R specific constant of the gas;
T temperature of the gas mixture.

6. The estimation method according to claim 3, wherein:
the temperature ($T_{int}$) and the pressure ($P_{int}$) of the gas mixture in the intake duct (6) are measured by means of a second sensor (27);

the temperature ($T_{man}$) and the pressure ($P_{man}$) of the gas mixture in the intake manifold (4) are measured by means of a third sensor (28); and in order to determine the density (ρ) of the gas mixture flowing through the intake duct (6), a mean between the measures of the second sensor (27) and of the third sensor (28) is used.

7. The estimation method according to claim 1, wherein the transport time ($T_{TR}$) is calculated by means of the following equation:

$$T_{TR} = (D*S*P)/(M*R*T) \qquad [13]$$

$T_{TR}$ transport time;
D distance existing between the position of the first sensor (29) and the cylinder (2);
M mass flow rate of the gas mixture flowing through the intake duct (6);
S cross section of the intake duct (6);
P pressure of the gas mixture;
R specific constant of the gas;
T temperature of the gas mixture.

8. The estimation method according to claim 1, wherein the transport time ($T_{TR}$) is calculated by means of the following equation:

$$T_{TR} = (V_{TR}*P)/(M*R*T) \qquad [14]$$

$V_{TR}$ transport volume;
M mass flow rate of the gas mixture flowing through the intake duct (6);
P pressure of the gas mixture;
R specific constant of the gas;
T temperature of the gas mixture.

9. The estimation method according to claim 8, wherein the transport volume ($V_{TR}$) is a fixed design information and is known a priori.

10. The estimation method according to claim 8, wherein the transport volume ($V_{TR}$) is determined based on an experimental map, which is stored in a control unit (26) and indicates the transport volume ($V_{TR}$) according to an intake efficiency ($ET_{int}$) and to the rotation speed (ω) of the internal combustion engine (1).

11. The estimation method according to claim 1, wherein a time delay is applied to the concentration (% EGR) of recirculated exhaust gas contained in the buffer (30) and corresponding to the third instant ($T_3$).

12. The estimation method according to claim 11, wherein the time delay is obtained by means of a first order filter.

13. The estimation method according to claim 12, wherein the first order filter has a gain that varies depending on a mass flow rate ($M_{TOT}$) of the gas mixture flowing through the intake duct (6).

14. The estimation method according to claim 12, wherein the first order filter has a gain that varies depending on a mass flow rate ($M_{TOT}$) of the gas mixture flowing through the intake duct (6) and depending on the advance time ($T_{pred}$).

* * * * *

UNITED STATES PATENT AND TRADEMARK OFFICE
CERTIFICATE OF CORRECTION

Page 1 of 1

PATENT NO. : 10,920,685 B2
APPLICATION NO. : 16/601727
DATED : February 16, 2021
INVENTOR(S) : Panciroli et al.

It is certified that error appears in the above-identified patent and that said Letters Patent is hereby corrected as shown below:

In the Claims

Column 12, Line 67 (Claim 1) delete "based on a concentration" and insert therefor --based on the concentration--.

Column 13, Lines 9-12 (Claim 1) delete "the advance time (Tpred) is calculated using the following equation:
    Tpred = Xp/(2*ω)
Tpred advance time;" and insert therefor --the advance time ($T_{pred}$) is calculated using the following equation:
    $T_{pred}$=Xp/(2*ω)
$T_{pred}$ advance time;--.

Signed and Sealed this
Twenty-first Day of December, 2021

Drew Hirshfeld
*Performing the Functions and Duties of the*
*Under Secretary of Commerce for Intellectual Property and*
*Director of the United States Patent and Trademark Office*